Sept. 23, 1924.

J. F. ANDERSON 1,509,698

STORAGE TANK

Filed Dec. 13, 1923

Inventor
John F. Anderson.

By

Attorney

Patented Sept. 23, 1924.

1,509,698

UNITED STATES PATENT OFFICE.

JOHN F. ANDERSON, OF SAN FRANCISCO, CALIFORNIA.

STORAGE TANK.

Application filed December 13, 1923. Serial No. 680,477.

*To all whom it may concern:*

Be it known that I, JOHN F. ANDERSON, a citizen of the United States of America, residing at San Francisco, in the county of San Francisco and State of California, have invented certain new and useful Improvements in Storage Tanks, of which the following is a specification.

This invention relates to an improvement in storage tanks, designed particularly for use as flush tanks or the like.

The invention is primarily directed to a means for automatically compressing the air and controlling the air vent in the tank, in order that the incoming water under pressure will operate against the contained air and finally create a volume of air within the tank under pressure, which will compel such water when flowing from the tank to be delivered under the pressure of the contained air. The invention is further directed to a means whereby the automatic control of the air vent may be manually adjusted to vary the volume of air finally remaining in the tank, and thereby in a measure control the pressure of the fluid when forced from the tank.

The invention is further directed to providing a tank having a single opening serving primarily as a water discharge opening, with the parts arranged so that the incoming water will enter the tank through this opening, and also the air vent pipe is passed through this opening. By this construction, the tank proper is provided with a single opening, and the additional openings heretofore provided for the water inlet and air vent are entirely avoided, thereby simplifying the construction of the tank, permitting it to be more readily made and maintained air and water tight, and materially increasing the life of the apparatus.

The invention more specifically includes a tank having an outlet opening, to which is removably secured, a short sleeve-like element, in which sleeve-like element, is supported the water inlet pipe, and the outlet end of the air vent pipe. This sleeve-like element also supports a disc-form valve manually operated, and when raised, permitting the flow of water around the valve and through a discharge pipe, and when closed or lowered, sealing the water outlet.

The invention will be described in the following specification, with particular reference to the accompanying drawings, in which.

Figure 2:
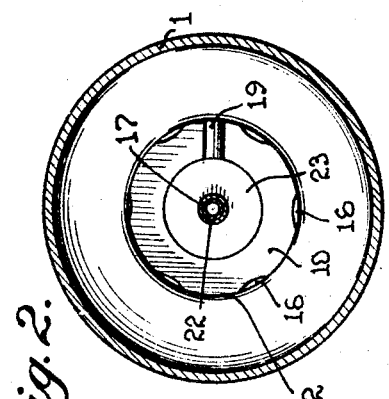
Fig. 2 is a section on line 2—2 of Fig. 1.
Figure 3:
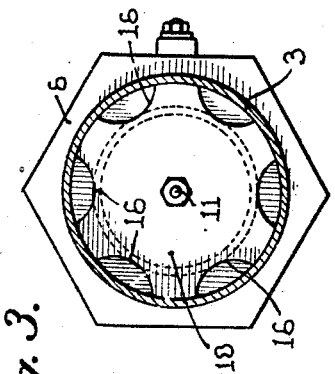
Fig. 3 is a section on line 3—3 of Fig. 1.
Figure 1:
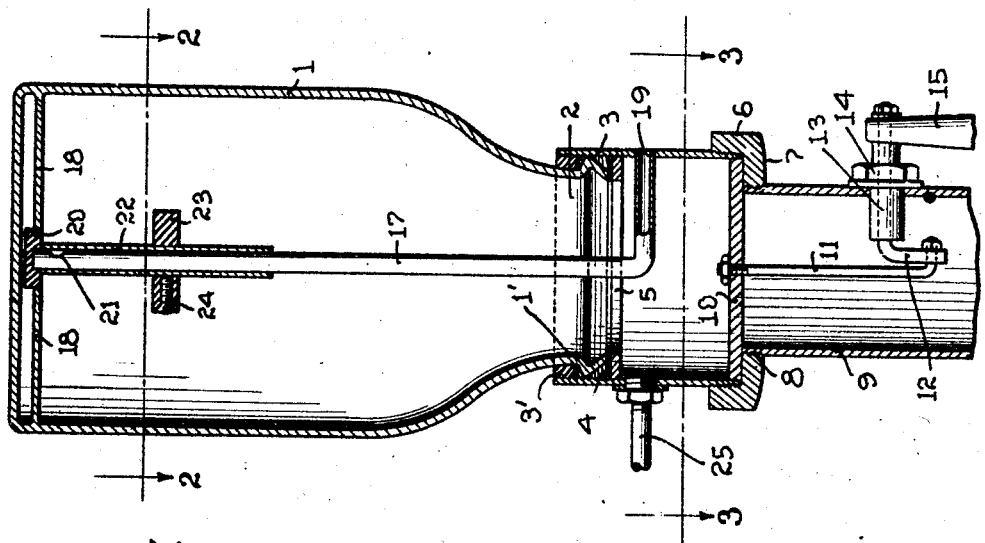
Fig. 1 is a vertical sectional view showing the improved storage tank.

The improved tank 1 is of any usual or desired outline form, having an outlet 2 at the lower end, on which is removably secured a sleeve 3. The sleeve is preferably interiorly threaded, and is connected to the tank by engagement with a threaded ring 3', split to slip over the end of the tank and rest on the shoulder 1'. A metal or like washer 4 is threaded into the sleeve, and, through interposed packing, bear against the lower end of the outlet 2, to maintain a sealing connection. The washer 4 has an opening 5 for the passage of the water. The lower end of the sleeve 3 is provided with a union 6 which extends below and closes a portion of the lower end of the sleeve 3 as at 7, the union having an opening 8, into which is threaded a discharge pipe 9. A valve 10 is supported in the sleeve 3 upon the upper end of a rod 11, which extends longitudinally of the discharge pipe 9 and is connected to the crank end 12 of an operating shaft 13 supported in a screw plug 14 secured in the side of the discharge pipe and provided with an operating handle 15, whereby the valve 10 may be elevated from its seat an appropriate distance. The valve 10 is formed with edge recesses 16, which when the valve is elevated, permits the water to flow around the valve and through the discharge pipe, these recesses being sealed by the inwardly projecting portion of the union when the valve is in lowered position.

Secured within the tank 1 is a pipe 17, which forms the air vent, this pipe being held in the upper end of the tank by spiders or arms 18, and projecting lengthwise the tank and opening through the wall of the sleeve 3 to the atmosphere, as at 19. This pipe is provided at the upper end with a sealing disc or washer 20, and immediately below this washer with an opening 21 to establish communication between the interior of the tank and the pipe. A pipe section 22 slidably surrounds the pipe 17, and this pipe section 22 is provided with a float 23, which through the medium of a set screw 24, may be held at any desired height on the pipe section 22. A service water inlet 25 leads into the tank through the sleeve 3, as shown.

Obviously, when the tank is empty, the pipe section 22 is at the lowermost position, and as the water enters through the inlet 25, the float will be gradually elevated by the rising water. The air in the tank will be forced by the rising water through the opening 21, the air pipe 17, and the outlet 19, until the float has forced the pipe section 22 to a position to close the opening 21 and to engage under the pressure of the water with the sealing washer 20. At this point further escape of the air from the tank is prevented, and the incoming water will compress the air to a point determined by the pressure of such incoming water, thereby storing a volume of air in the tank, which will exert an outgoing pressure on the water when the valve 10 is elevated.

As the float 23 is adjustable on the pipe section 22, it is apparent that the air cutoff may be received at various heights of water in the tank, and hence the volume of air and its pressure determined. Thus the tank can be made a pressure discharge tank, or by appropriate arrangement of the float, practically all of the air in the tank can be permitted to escape so that the tank will act merely as a gravity flow tank.

By leading the air pipe through the tank and discharging to the atmosphere at the lower end thereof, all projection of any character above or beyond the surface of the tank is avoided, and hence the necessity for providing appropriate connections, sealing medium, and the like, is avoided.

Claims:

1. A flushing tank having an air vent pipe extending longitudinally of the tank and opening to the atmosphere at the lower end of said tank, said air vent pipe being provided with an opening communicating with the tank at the upper end of the pipe, and float control means for closing said opening and sealing the air vent pipe against the tank.

2. A flushing tank having an air vent pipe extending longitudinally of the tank and opening to the atmosphere at the bottom of the tank, a sealing gasket carried by the upper end of the pipe, the pipe being formed with an opening communicating with the tank at a point near the gasket, a sealing pipe slidable on the air vent pipe and adapted to close said opening and move into sealing engagement with said gasket, and a float carried by said sealing pipe.

3. A flushing tank having an air vent pipe extending longitudinally of the tank and opening to the atmosphere at the bottom of the tank, a sealing gasket carried by the upper end of the pipe, the pipe being formed with an opening communicating with the tank at a point near the gasket, a sealing pipe slidable on the air vent pipe and adapted to close said opening and move into sealing engagement with said gasket, and a float carried by and adjustable on said sealing pipe.

4. A flush tank having an air vent pipe opening through the lower end of the tank, adjustable means for controlling communication between said air vent pipe and the tank, a discharge sleeve connected to the lower end of the tank and in communication therewith, a union closing a portion of the lower end of said discharge sleeve, a discharge pipe carried by said union and communicating with the sleeve, and an edge recessed valve operable in the sleeve with its recesses closed against the discharge pipe when the valve is bearing upon the union.

5. A flush tank having an air vent pipe opening through the lower end of the tank, adjustable means for controlling communication between said air vent pipe and the tank, a discharge sleeve connected to the lower end of the tank and in communication therewith, a union closing a portion of the lower end of said discharge sleeve, a discharge pipe carried by said union and communicating with the sleeve, an edge recessed valve operable in the sleeve with its recesses closed against the discharge pipe when the valve is bearing upon the union, and means projecting through the discharge sleeve for elevating the valve to permit the water to flow through said edge recesses and around the valve.

6. A flush tank having a single outlet, a sleeve removably secured thereto, a water inlet pipe supported by the sleeve, and an air vent pipe leading into the upper end of the tank and having its outlet end supported by and opening through the sleeve.

7. A flush tank having a single outlet, a sleeve removably secured thereto, a water inlet pipe supported by the sleeve, an air vent pipe leading into the upper end of the tank and having its outlet end supported by and opening through the sleeve, and a discharge pipe removably supported by the sleeve.

8. A flush tank having a single outlet, a sleeve removably secured thereto, a water inlet pipe supported by the sleeve, an air vent pipe leading into the upper end of the tank and having its outlet end supported by and opening through the sleeve, a discharge pipe removably supported by the sleeve, and a manually operable valve for controlling the discharge arranged and operating in the sleeve.

In testimony whereof I affix my signature.

JOHN F. ANDERSON. [L. S.]